United States Patent
Tian et al.

(10) Patent No.: US 11,960,422 B2
(45) Date of Patent: Apr. 16, 2024

(54) DIRECT MEMORY ACCESS TRACKING FOR PASS-THROUGH DEVICES IN VIRTUALIZED ENVIRONMENTS

(71) Applicant: Intel Corporation, Santa Clara, CA (US)

(72) Inventors: Kun Tian, Shanghai (CN); Yan Zhao, Shanghai (CN); Yu Zhang, Beijing (CN)

(73) Assignee: Intel Corporation, Santa Clara, CA (US)

( * ) Notice: Subject to any disclaimer, the term of this patent is extended or adjusted under 35 U.S.C. 154(b) by 122 days.

(21) Appl. No.: 17/431,739

(22) PCT Filed: Mar. 28, 2019

(86) PCT No.: PCT/CN2019/080020
§ 371 (c)(1),
(2) Date: Aug. 18, 2021

(87) PCT Pub. No.: WO2020/191697
PCT Pub. Date: Oct. 1, 2020

(65) Prior Publication Data
US 2022/0129399 A1 Apr. 28, 2022

(51) Int. Cl.
*G06F 13/28* (2006.01)
(52) U.S. Cl.
CPC .................................. *G06F 13/28* (2013.01)
(58) Field of Classification Search
CPC ....................................................... G06F 13/28
USPC ........................................................... 710/22
See application file for complete search history.

(56) References Cited

U.S. PATENT DOCUMENTS

| | | | | |
|---|---|---|---|---|
| 7,209,994 B1 * | 4/2007 | Klaiber | ............... | G06F 9/45533 710/262 |
| 8,392,628 B2 * | 3/2013 | Santos | .................. | G06F 12/109 711/6 |
| 8,479,195 B2 * | 7/2013 | Adams | ................ | G06F 9/45558 718/1 |
| 9,195,487 B2 * | 11/2015 | Adams | ................ | G06F 9/45545 |
| 9,697,027 B1 * | 7/2017 | Hazra | ........................ | G06F 9/50 |
| 9,977,690 B2 | 5/2018 | Tsirkin et al. | | |

(Continued)

OTHER PUBLICATIONS

International Search Report and Written Opinion for International Patent Application No. PCT/CN2019/080020, dated Mar. 28, 2019, 9 pages.

*Primary Examiner* — Titus Wong
(74) *Attorney, Agent, or Firm* — Jordan IP Law, LLC

(57) ABSTRACT

Systems, apparatuses and methods may provide for a frontend driver that notifies a hypervisor of a map request from a guest driver of a device, wherein the device is passed through to and directly controlled by a virtual machine, and wherein the map request is associated with an attempt of the device to access a guest memory page in a virtualized execution environment. The frontend driver may also determine whether the guest memory page is pinned and send a map hypercall to the hypervisor if the guest memory page is not pinned. Additionally, the hypervisor may determine that the guest memory page is pinned, determine, based on a direct memory access (DMA) bitmap, that an unmap request from the guest driver has been issued, and unpin the guest memory page.

22 Claims, 7 Drawing Sheets

(56) References Cited

U.S. PATENT DOCUMENTS

| | | | |
|---|---|---|---|
| 2009/0113110 A1* | 4/2009 | Chen | G06F 9/45558 |
| | | | 718/1 |
| 2010/0180276 A1 | 7/2010 | Jiva | |
| 2013/0339953 A1* | 12/2013 | Wibling | G06F 9/45533 |
| | | | 718/1 |
| 2015/0007170 A1* | 1/2015 | Tsirkin | G06F 9/4486 |
| | | | 718/1 |
| 2016/0285958 A1 | 9/2016 | Das et al. | |
| 2016/0314076 A1* | 10/2016 | Wibling | G06F 12/109 |
| 2017/0147511 A1 | 5/2017 | Tsirkin | |
| 2017/0153908 A1 | 6/2017 | Han et al. | |
| 2018/0349162 A1 | 12/2018 | Tian et al. | |
| 2018/0373556 A1 | 12/2018 | Tian et al. | |
| 2018/0374188 A1 | 12/2018 | Lv et al. | |

\* cited by examiner

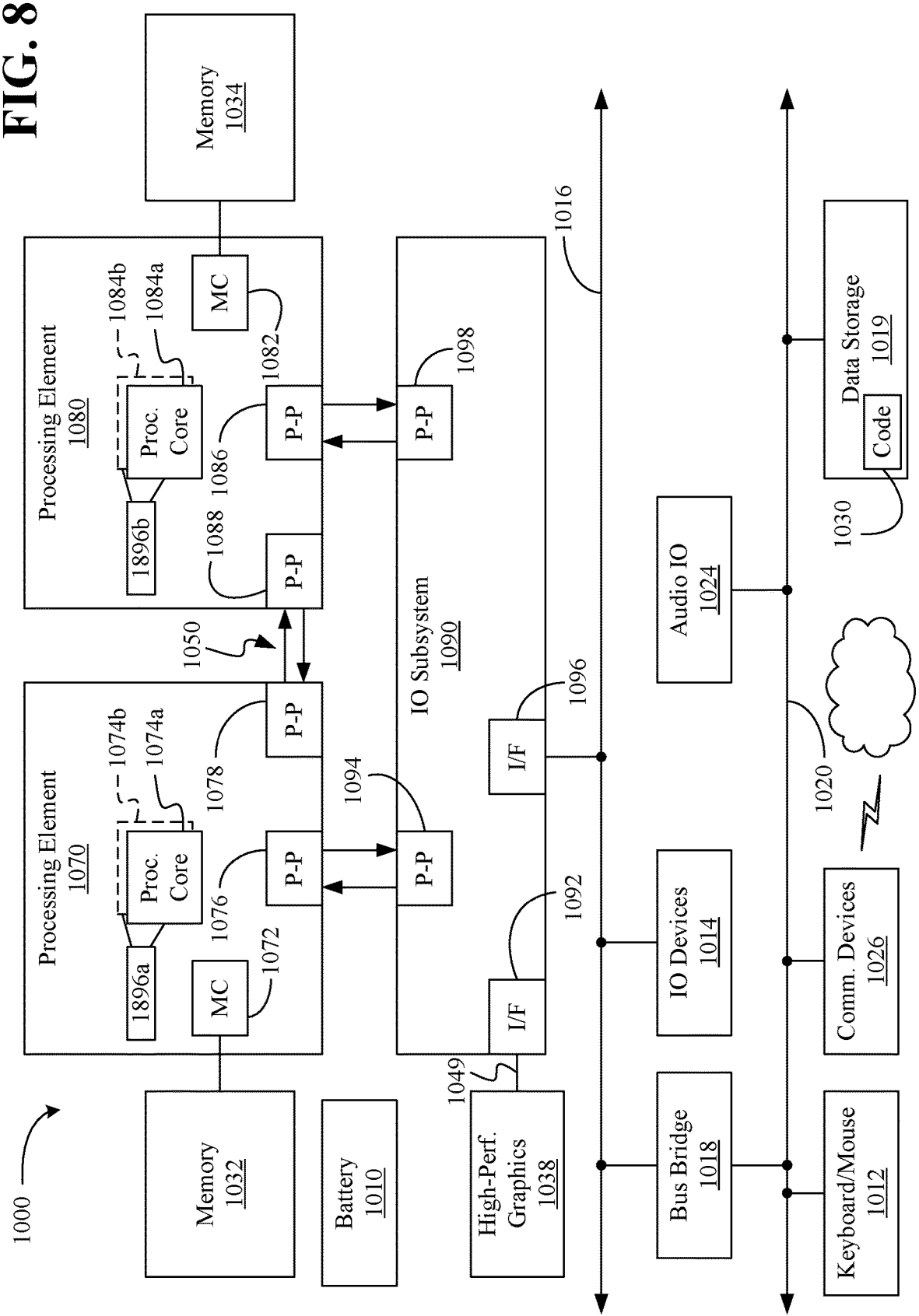

US 11,960,422 B2

DIRECT MEMORY ACCESS TRACKING FOR PASS-THROUGH DEVICES IN VIRTUALIZED ENVIRONMENTS

CROSS REFERENCE TO RELATED APPLICATIONS

The present application is a U.S. National Phase Patent Application, which claims the benefit of priority to International Patent Application No. PCT/CN2019/080020 filed on Mar. 28, 2019.

TECHNICAL FIELD

Embodiments generally relate to virtualized execution environments. More particularly, embodiments relate to direct memory access (DMA) tracking for pass-through devices in virtualized environments.

BACKGROUND

Virtualized execution environments generally enable a plurality of virtual machines (VMs) to independently execute operating systems on the same physical machine (e.g., host). In such a case, a virtual machine monitor (VMM, hypervisor, etc.) may create and run the VMs. In some architectures, devices are passed through to, and directly controlled by, a VM. For example, a "pass-through" device might use DMA transactions to access the system main memory of the "owner" VM independently of the VMM. The inability of the VMM to track DMA transactions may lead to VM boot latencies (e.g., due to VMM pinning of all guest memory pages at VM creation time), difficulties in overcommitting memory (e.g., due to the inability to reclaim and swap pinned pages of the VM) and/or unacceptability long service shutdown times during VM live migration (e.g., due to all guest memory pages of the VM being considered dirty).

BRIEF DESCRIPTION OF THE DRAWINGS

The various advantages of the embodiments will become apparent to one skilled in the art by reading the following specification and appended claims, and by referencing the following drawings, in which:

FIG. 8 is a block diagram of an example of a multi-processor based computing system according to an embodiment.

DESCRIPTION OF EMBODIMENTS

Figure 1:
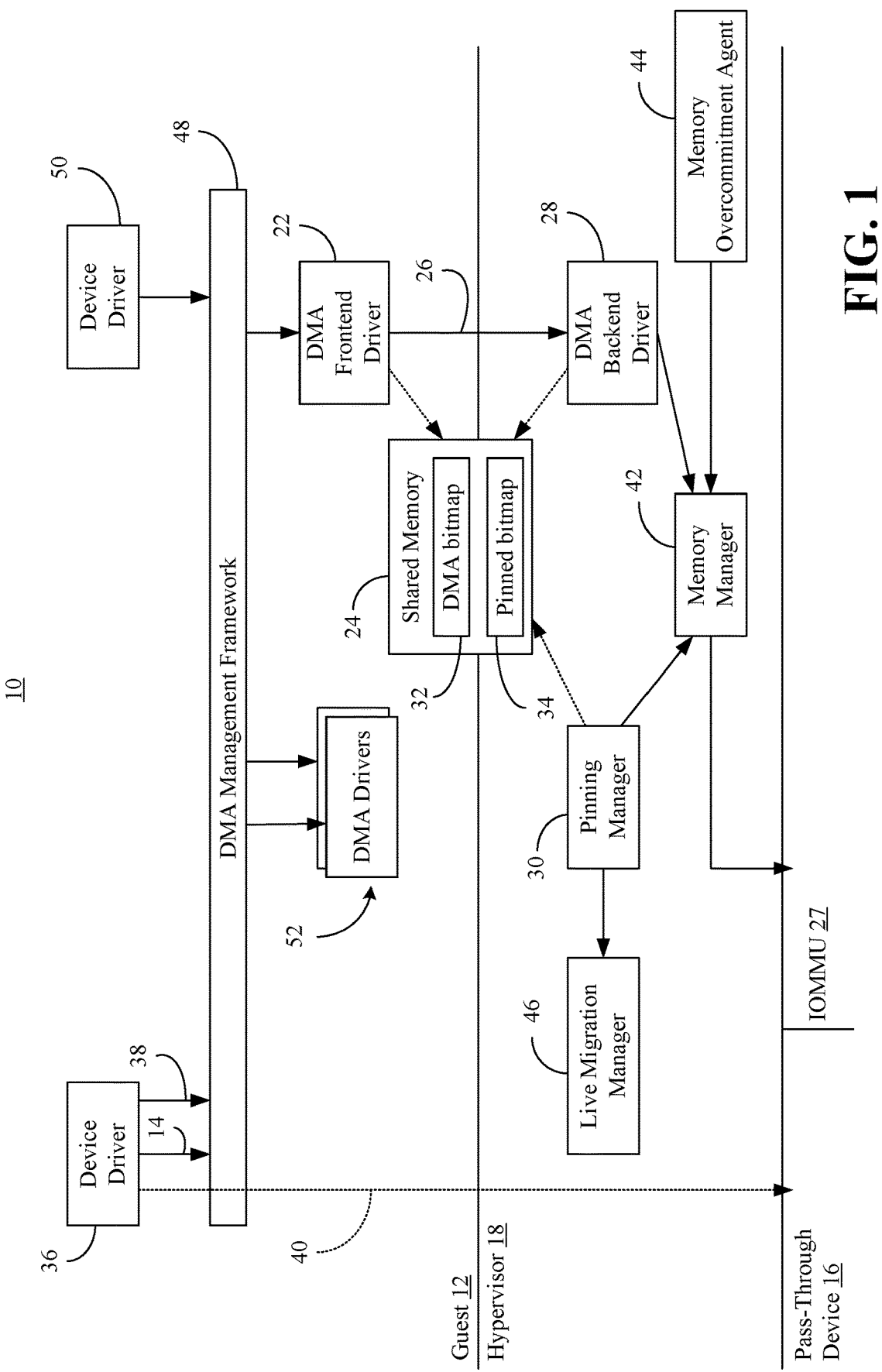
FIG. 1 is a block diagram of an example of a DMA architecture according to an embodiment.

Turning now to FIG. 1, a DMA architecture 10 is shown in which a guest 12 (e.g., VM) enables a pass-through device 16 (e.g., graphics processor, storage drive, network interface card/NIC) to conduct one or more DMA transactions with a system memory (not shown) and without the knowledge of a hypervisor 18 (e.g., VMM) that creates and runs the guest 12. More particularly, the illustrated guest 12 directly controls the pass-through device 16 via one or more messages 40 that bypass the hypervisor 18 on a path (e.g., wire) that is not monitored by the hypervisor 18. In general, a DMA frontend driver 22 (e.g., coordinated informational DMA/ciDMA driver) in the guest 12 coordinates with a DMA backend driver 28 (e.g., ciDMA device model) in the hypervisor 18 to ensure that the pass-through device 16 is able to conduct the DMA transactions in a coordinated way so that the hypervisor 18 can track DMA activities on the pass-through device 16.

More particularly, the illustrated frontend driver 22 uses a shared memory 24 to notify the hypervisor 18 of a map request 14 from a guest device driver 36 (e.g., guest driver) of the pass-through device 16, wherein the map request 14 is associated with an attempt of the pass-through device 16 to access a guest memory page in the virtualization environment. The frontend driver 22 may also use the shared memory 24 to determine whether the guest memory page has been pinned (e.g., locked, fixed, wired and/or otherwise prevented from being reclaimed or swapped). If the guest memory page is pinned, the notification is an "exit-less" that merely updates the shared memory 24. If the guest memory page is not pinned, the illustrated frontend driver 22 sends a map hypercall 26 to exit to the DMA backend driver 28, where the map hypercall 26 causes the hypervisor 18 to pin the guest memory page in an input/output memory mapped unit (IOMMU) 27.

The illustrated IOMMU 27 is a hardware agent that isolates DMA activities between passthrough devices, so that each passthrough device can only DMA to its owner's memory instead of attacking random system memory. The IOMMU 27 may provide a per-device DMA remapping structure that is configured by the hypervisor 18. Pinning guest memory pages in the DMA remapping structure may be necessary because most devices don't tolerate DMA page faults. Unlike conventional solutions in which all of the guest memory pages are pinned at VM creation time because the hypervisor 18 has no insight into DMA activities of passthrough device, the illustrated architecture 10 enables the hypervisor 18 to accurately pin guest memory pages that are currently used as a DMA buffer. Accordingly, the total pinned memory set is much smaller at a given time.

In response to the map hypercall 26, the backend driver 28 may send a request to a memory manager 42 for the guest memory page to be pinned. In an embodiment, pinning the guest memory page involves allocating the memory in a manner that prevents the page from being reclaimed or swapped with another page, and updating DMA remapping structures in accordance with an IOMMU specification. The illustrated backend driver 28 notifies the frontend driver 22 and a pinning manager 30 (e.g., guest DMA/gDMA manager) that the guest memory page has been pinned via the shared memory 24.

Similarly, the illustrated frontend driver 22 uses the shared memory 24 to subsequently notify the pinning manager 30 of the hypervisor 18 that an unmap request 38 has been issued by the guest device driver 36. In an embodiment, the unmap request 38 is associated with an attempt of the pass-through device 16 to discontinue access to the guest memory page. Thus, the pinning manager 30 may periodically scan the shared memory 24 to both determine that the guest memory page is pinned and determine that the unmap request 38 has been issued. In such a case, the guest memory page is reclaimable and the illustrated pinning manager 30 sends an asynchronous request to the memory manager 42 to unpin the guest memory page. The pinning manager 30 may also update the shared memory 24 to reflect that the guest memory page has been unpinned. In such an embodiment, the notification of the unmap request 38 is always exit-less and only involves updating shared memory.

In one embodiment, the hypervisor 18 bypasses pinning operations for all guest memory at the creation time of the guest 12. Thus, only DMA pages are pinned at any given moment in time and VM boot latencies are significantly reduced. Moreover, a memory overcommitment agent 44 may reclaim the unpinned guest memory page (as well as any other non-DMA pages) in accordance with an overcommitment policy. The illustrated DMA architecture 10 therefore increases the amount of available memory, which in turn enhances performance.

Additionally, the illustrated pinning manager 30 notifies a live migration manager 46 that the guest memory page is dirty (e.g., changed, but not yet written out to disk). Accordingly, the live migration manager 46 does not need to consider all guest memory pages of the guest 12 as dirty. Rather, when migrating the guest 12 from one platform/server to another, the live migration manager 46 may perform iterative pre-copy operations only on the guest memory pages that have been the target of DMA transactions. Accordingly, the illustrated architecture 10 reduces service shutdown times during VM live migration.

In one example, the shared memory 24 includes a DMA bitmap 32, where each bit in the DMA bitmap 32 corresponds to a guest page frame number (GFN, e.g., associated with a particular guest memory page). Thus, to notify the hypervisor 18 of the map request 14, the frontend driver 22 may set the bit corresponding to the GFN of the guest memory page to be mapped. In an embodiment, the frontend driver 22 notifies the hypervisor 18 of the unmap request 38 by clearing the bit corresponding to the GFN of the guest memory page to be unmapped, without need of issuing a hypercall.

Similarly, the illustrated shared memory 24 also includes a pinned bitmap 34, where each bit in the pinned bitmap 34 corresponds to a GFN and a guest memory page. Thus, to notify the frontend driver 22 and the pinning manager 30 that the guest memory page is pinned, the backend driver 28 sets the bit corresponding to the GFN of the guest memory page. Additionally, to asynchronously notify the frontend driver 22 and the backend driver 28 that the guest memory page is unpinned, the pinning manager 30 may clear the bit corresponding to the GFN of the guest memory page. In one example, the hypervisor 18 pins the guest memory page and resets the bit corresponding to the GFN of the guest memory page if a race condition is detected.

With regard to the race condition, checking the DMA bitmap 32 and the pinned bitmap 34 are two operations that are not atomic. It may therefore be possible that the map request 14 occurs after the pinning manager 30 finds the bit cleared in the DMA bitmap 32 and before the pinning manager 30 clears the pinned bitmap 34. In that case, the requested page may appear to be already pinned to the guest frontend driver 22, and hypercall occurs. In such case, the pinning manager 30 rechecks the DMA bitmap 32 and the pinned bitmap 34, before sending a unpin request to the memory manger 42, as discussed in greater detail below.

The DMA bitmap 32 and the pinned bitmap 34 may be implemented together as a multi-level paging structure. In that case, each page table entry (PTE) may contain multiple bits to indicate DMA-mapped/pinned status or other permission information. Thus, the host/guest may use atomic compare and exchange (cmpxchg) instructions to update different bits in same PTE entry.

The interface between the guest 12 and the hypervisor 18 may be considered "informational" because the frontend driver 22 simply collects information of guest 12 DMA activity with negligible cost. The illustrated frontend driver 22 may be considered "dumb" to the extent that it does not provide DMA remapping capability to the guest 12 as a traditional virtual input/output memory mapped unit (vIOMMU) would provide. Therefore, there may be no need to invalidate physical input/output translation lookaside buffer (IOTLB) entries upon encountering guest DMA map/unmap requests.

Additionally, the interface between the guest 12 and the hypervisor 18 may be considered "coordinated" because bi-directional information sharing occurs between the hypervisor 18 (e.g., host) and the guest 12. The guest 12 shares the currently-DMA-mapped page bitmap to the host, while the host shares the currently-pinned page bitmap to the guest 12. VM-exits on map requests are largely reduced (e.g., only when a to-be-mapped page is not currently pinned), while VM-exits on unmap requests are completely eliminated (e.g., since there is no need to invalidate the physical IOTLB). The pinning manager 30 (e.g., a host thread) periodically scans both of the bitmaps 32, 34 to conduct a heuristic page unpin (e.g., if a pinned page is not currently DMA-mapped). Unpinned pages may be then reclaimed or swapped.

The illustrated architecture 10 therefore provides a paravirtualized interface to conducting light-weight DMA tracking of the pass-through device 16. In an embodiment, the architecture 10 also includes a DMA management framework 48 one or more other guest device drivers 50 and one or more DMA drivers 52 (e.g., software IOTLB driver, hardware IOMMU driver, etc.). In an embodiment, the guest OS ensures that only one of the DMA drivers 52 is enabled at a given time.

The illustrated architecture 10 also provides much lower performance cost compared to existing vIOMMU approaches, which thus paves the way for inclusion in major guest OS (operating system) distributions. For example, all unmap hypercalls may be eliminated and map hypercalls may be required only when the requested page is not in the pinned bitmap 34. The number of map hypercalls may be further reduced by increasing the locality of DMA pages, which reduces total size of pinned pages at a given time. For example, the frontend driver 22 may implement a mapping cache mechanism (e.g., based on a least recently used/LRU policy). Similarly, the pinning manager 30 may also implement a pinning cache mechanism (e.g., also based on an LRU policy), to reduce unnecessary unpin and hypercall overhead on frequently-mapped pages.

The architecture 10 may also achieve fast VM creation time, with negligible latency when the pass-through device 16 is involved. The VM can start with no pages pinned (e.g., reduced pin-page overhead at boot time relative to conventional solutions). Guest DMA pages may be pinned on-demand based on actual driver usage, which happens mostly after boot.

Indeed, DMA remapping capability is currently not a widely-used feature within virtualization deployments, due to both performance overhead and ecosystem readiness (e.g. lack of shared virtual memory/SVM-capable devices). In such case, foregoing DMA remapping may be a good tradeoff that enables more pass-through device usages.

In some usages, the illustrated architecture 10 may be combined with a vIOMMU. For example, the guest 12 may have only interrupt remapping capability on the vIOMMU. In such case, ciDMA can be defined as a special DMA capability (e.g., similar to pass-through) on vIOMMU, with the same aforementioned benefits. Moreover, the guest 12 may need the DMA remapping capability of a vIOMMU (IOVA→GPA/IO virtual address to guest physical address, e.g., to support a data plane developer kit/DPDK or SVM). In such case, map/unmap operations by the guest 12 may be trapped (e.g., though on a batched basis) to invalidate host IOMMU IOTLB entries. Here, bi-directional information sharing in ciDMA may not help reduce hypercalls. The pinning manager 30, however, may still be leveraged to heuristically unpin pages.

Figure 2A:
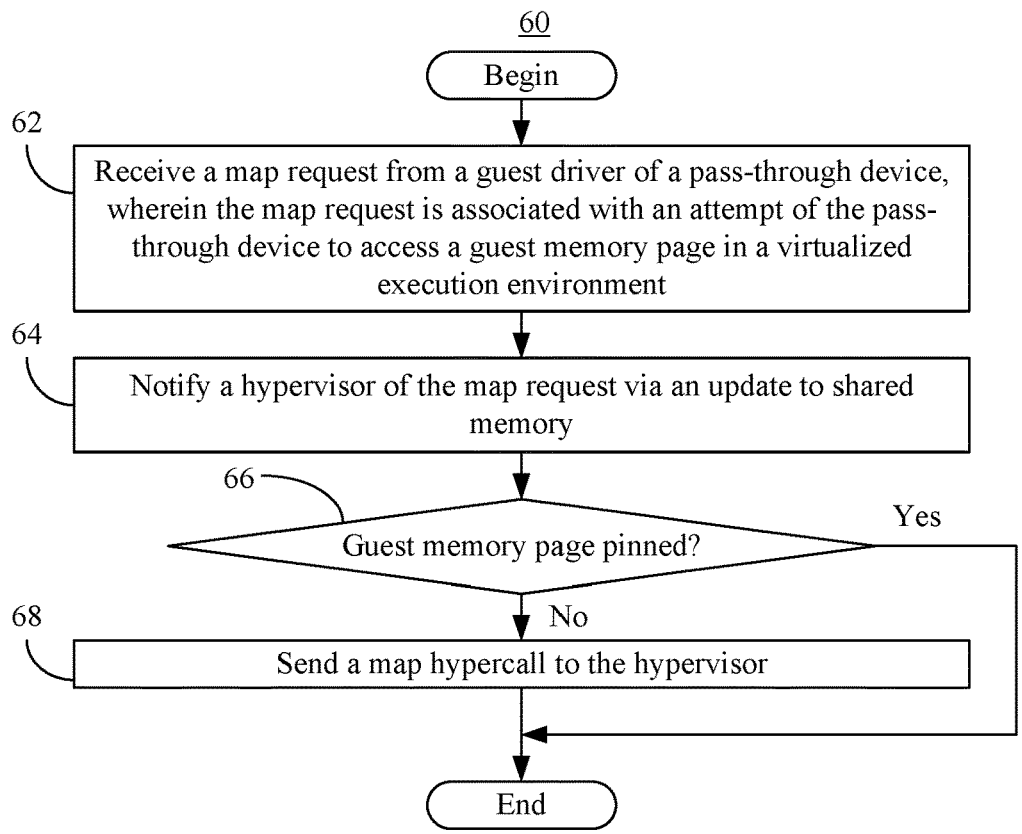
FIG. 2A is a flowchart of an example of a method of operating a frontend driver to conduct mapping operations according to an embodiment.

FIG. 2A shows a method 60 of operating a frontend driver to conduct mapping operations. The method 60 may generally be implemented in a frontend driver such as, for example, the DMA frontend driver 22 (FIG. 1), already discussed. More particularly, the method 60 may be implemented as one or more modules in a set of logic instructions stored in a machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality hardware logic using circuit technology such as, for example, application specific integrated circuit (ASIC), complementary metal oxide semiconductor (CMOS) or transistor-transistor logic (TTL) technology, or any combination thereof.

For example, computer program code to carry out operations shown in the method 60 may be written in any combination of one or more programming languages, including an object oriented programming language such as JAVA, SMALLTALK, C++ or the like and conventional procedural programming languages, such as the "C" programming language or similar programming languages. Additionally, logic instructions might include assembler instructions, instruction set architecture (ISA) instructions, machine instructions, machine dependent instructions, microcode, state-setting data, configuration data for integrated circuitry, state information that personalizes electronic circuitry and/or other structural components that are native to hardware (e.g., host processor, central processing unit/CPU, microcontroller, etc.).

Illustrated processing block 62 receives (e.g., intercepts) a map request from a guest driver of a pass-through device (e.g., a device that is passed through to and directly controlled by a VM), wherein the map request is associated with an attempt of the pass-through device to access a guest memory page in a virtualized execution environment. A hypervisor is notified of the map request via an update to shared memory at illustrated block 64. The notification therefore generally includes updating data and sending an event (e.g., an exit-less notification). More particularly, block 64 may include setting a bit corresponding to a GPN in a DMA bitmap, wherein the GPN is associated with the guest memory page. Additionally, the DMA bitmap may be located in a shared memory that is accessible to the hypervisor and the frontend driver.

A determination may be made at block 66 as to whether the guest memory page is pinned. In an embodiment, block 66 includes determining whether a bit corresponding to the GPN in a pinned bitmap is set, wherein the pinned bitmap is also located in a shared memory that is accessible to the hypervisor and the frontend driver. If it is determined at block 66 that the guest memory page is not pinned, illustrated block 68 sends a map hypercall to the hypervisor. Otherwise, the method 60 terminates without sending the map hypercall to the hypervisor. The illustrated method 60 does not perform any unmap hypercalls.

Figure 2B:
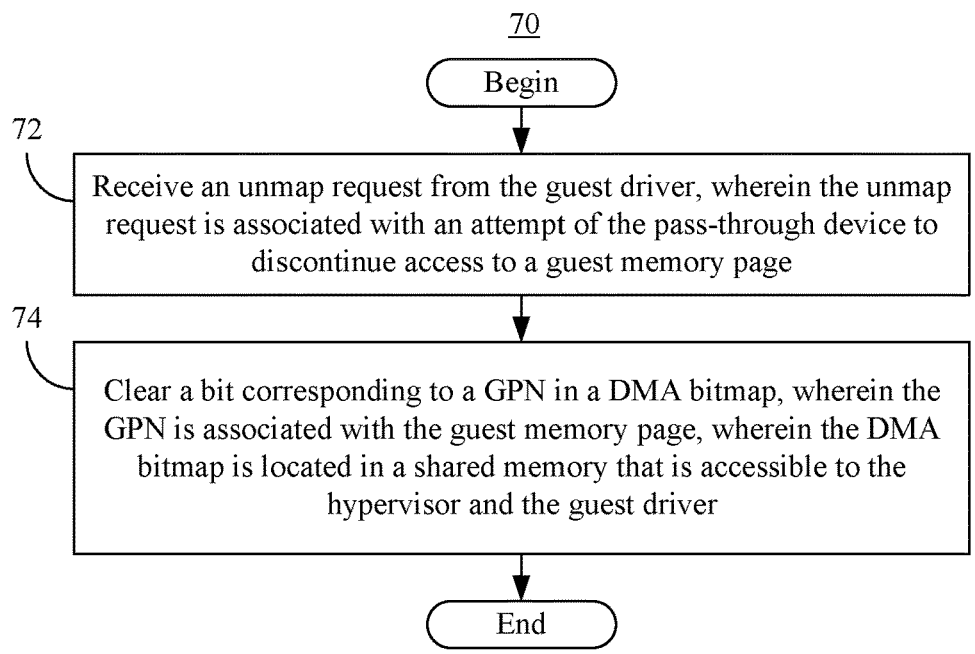
FIG. 2B is a flowchart of an example of a method of operating a frontend driver to conduct unmapping operations via a DMA bitmap according to an embodiment.

FIG. 2B shows a method 70 of operating a frontend driver to conduct unmapping operations via a DMA bitmap. The method 70 may generally be implemented in a frontend driver such as, for example, the DMA frontend driver 22 (FIG. 1), already discussed. More particularly, the method 70 may be implemented as one or more modules in a set of logic instructions stored in a machine- or computer-readable storage medium such as RAM, ROM, PROM, firmware, flash memory, etc., in configurable logic such as, for example, PLAs, FPGAs, CPLDs, in fixed-functionality hardware logic using circuit technology such as, for example, ASIC, CMOS or TTL technology, or any combination thereof.

Illustrated processing block 72 provides for receiving an unmap request from a guest driver of a pass-through device, wherein the unmap request is associated with an attempt of the pass-through device to discontinue access to a guest memory page. In an embodiment, block 74 clears a bit corresponding to a GPN in the DMA bitmap, wherein the GPN is associated with the guest memory page. In the illustrated example, the DMA bitmap is located in a shared memory that is accessible to the hypervisor and the guest driver. No unmap hypercall is conducted because there is no mandatory host handling required. With regard to mandatory host handling, there is no need to flush the physical IOMMU cache since DMA remapping capability is not exposed into the guest. Accordingly, the host may leave the page pinned, until later when the pinned manager captures the latest state.

Figure 3A:
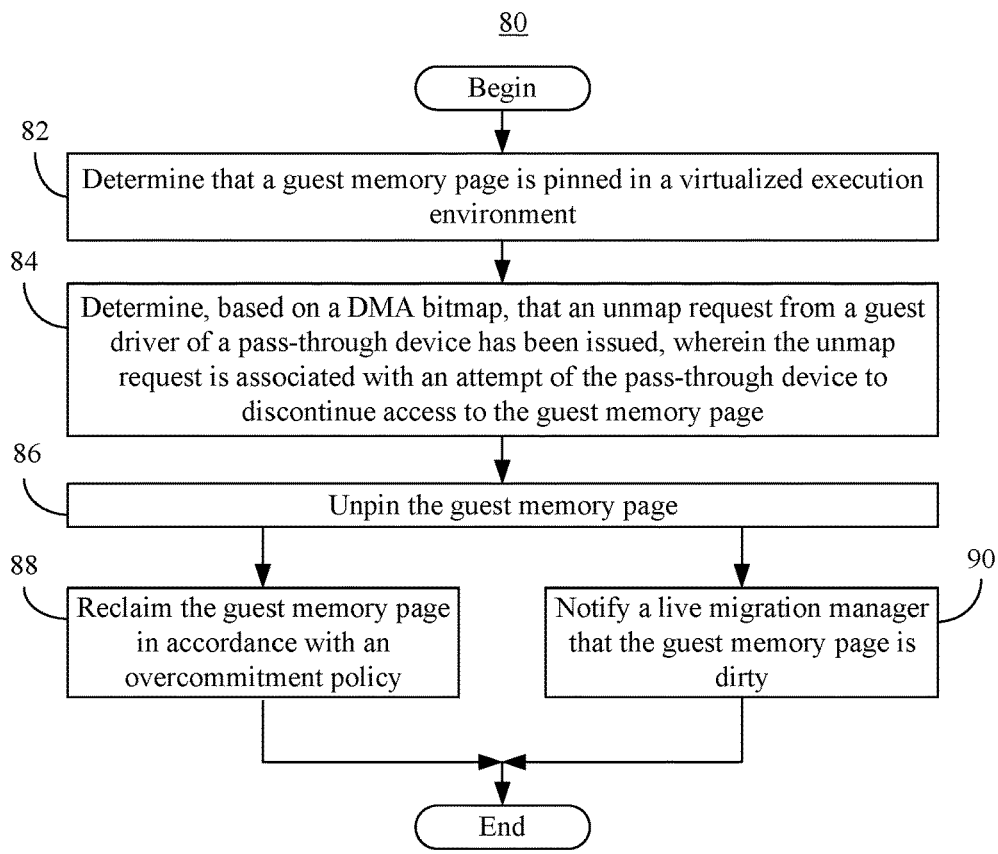
FIG. 3A is a flowchart of an example of a method of operating a hypervisor according to an embodiment.

FIG. 3A shows a method 80 of operating a hypervisor. The method 80 may generally be implemented in a hypervisor such as, for example, the hypervisor 18 (FIG. 1), already discussed. More particularly, the method 80 may be implemented as one or more modules in a set of logic instructions stored in a machine- or computer-readable storage medium such as RAM, ROM, PROM, firmware, flash memory, etc., in configurable logic such as, for example, PLAs, FPGAs, CPLDs, in fixed-functionality hardware logic using circuit technology such as, for example, ASIC, CMOS or TTL technology, or any combination thereof.

Illustrated processing block 82 determines that a guest memory page is pinned in a virtualized execution environment. In an embodiment, block 82 includes asynchronously detecting that a bit in a pinned bitmap is set, wherein the bit corresponds to a GPN of the guest memory page. As already noted, the pinned bitmap may be stored in a shared memory. Block 84 provides for determining, based on a DMA bitmap, that an unmap request from a guest driver of a pass-through device has been issued. The DMA bitmap may be located in the shared memory (e.g., that is accessible by the hypervisor and the guest driver). In the illustrated example, the unmap request is associated with an attempt of the pass-through device to discontinue access to the guest memory page. In one example, block 84 includes determining that a bit corresponding to a GPN in the DMA bitmap is not set, wherein the GPN is associated with the guest memory page.

Block 86 unpins the guest memory page. In an embodiment, block 86 includes instructing a memory manager to unpin the guest memory page and clearing a bit corresponding to a GPN in the pinned bitmap, wherein the GPN is associated with the guest memory page. The illustrated method 80 also provides for reclaiming the guest memory page in accordance with an overcommitment policy at block 88 and notifying a live migration manager that the guest memory page is dirty at block 90.

Figure 3B:
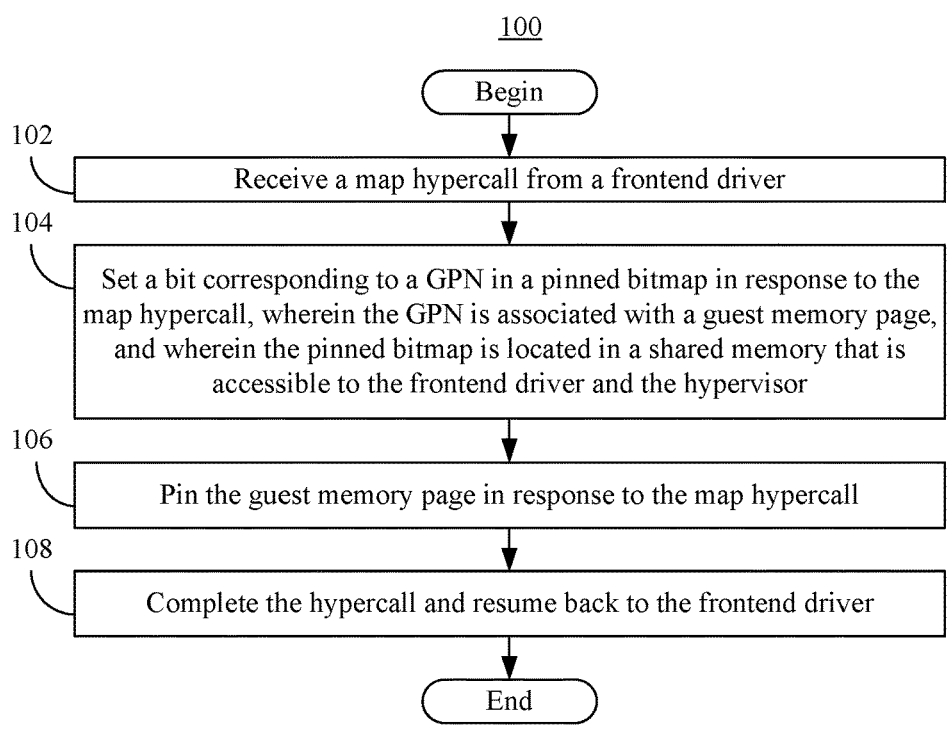
FIG. 3B is a flowchart of an example of a method of operating a hypervisor to conduct pinning operations according to an embodiment.

FIG. 3B shows a method 100 of operating a hypervisor to conduct pinning operations. The method 100 may generally be implemented in a hypervisor such as, for example, the hypervisor 18 (FIG. 1), already discussed. More particularly, the method 100 may be implemented as one or more modules in a set of logic instructions stored in a machine- or computer-readable storage medium such as RAM, ROM, PROM, firmware, flash memory, etc., in configurable logic such as, for example, PLAs, FPGAs, CPLDs, in fixed-functionality hardware logic using circuit technology such as, for example, ASIC, CMOS or TTL technology, or any combination thereof.

Illustrated processing block 102 provides for receiving a map hypercall from a frontend driver, wherein a bit corresponding to a GPN in a pinned bitmap is set at block 104 in response to the map hypercall. In the illustrated example, the GPN is associated with a GPN and the pinned bitmap is located in a shared memory that is accessible to the frontend driver and the hypervisor. In an embodiment, the guest memory page is pinned at block 106 in response to the map hypercall. Block 106 may include requesting that a memory manager pin the guest memory page. Illustrated block 108 completes the hypercall and resumes back to the frontend driver.

Figure 4:
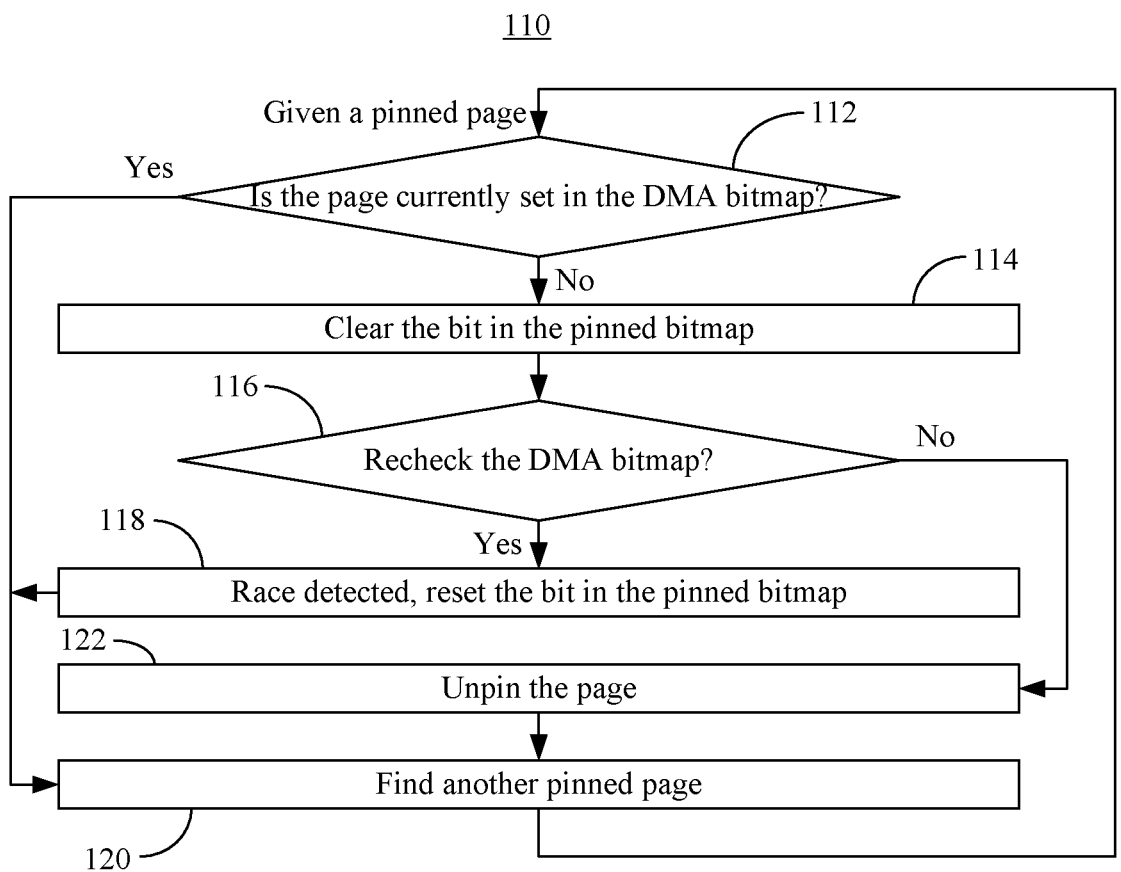
FIG. 4 is a flowchart of an example of a method of operating a pinning manager according to an embodiment.

FIG. 4 shows a method 110 of operating a pinning manager. The method 110 may generally be implemented in a pinning manager such as, for example, the pinning manager 30 (FIG. 1), already discussed. More particularly, the method 110 may be implemented as one or more modules in a set of logic instructions stored in a machine- or computer-readable storage medium such as RAM, ROM, PROM, firmware, flash memory, etc., in configurable logic such as, for example, PLAs, FPGAs, CPLDs, in fixed-functionality hardware logic using circuit technology such as, for example, ASIC, CMOS or TTL technology, or any combination thereof.

Given a pinned page, illustrated processing block 112 determines whether the page is currently set in the DMA bitmap. If not, block 114 may clear the bit in the pinned bitmap. In an embodiment, a determination is made at block 116 as to whether the DMA bitmap is to be rechecked (e.g., whether race detection is enabled), in case that the frontend driver may serve a map request between blocks 112 and 114. In such a case, no map hypercall is issued since the bit in the pinned bitmap is still valid, thus pinning manager captures such race and terminates the unpin operation immediately. If such a race may be detected at block 118, the pinning manger resets the bit in the pinned bitmap. The illustrated method 110 then proceeds to block 120 and finds another page. If it is determined at block 116 that the DMA bitmap is not to be rechecked, the method 110 unpins the page at block 122 and proceeds to block 120. If it is determined at block 112 that the page is not currently set in the DMA bitmap, the illustrated method 110 proceeds directly to block 120.

Figure 5:
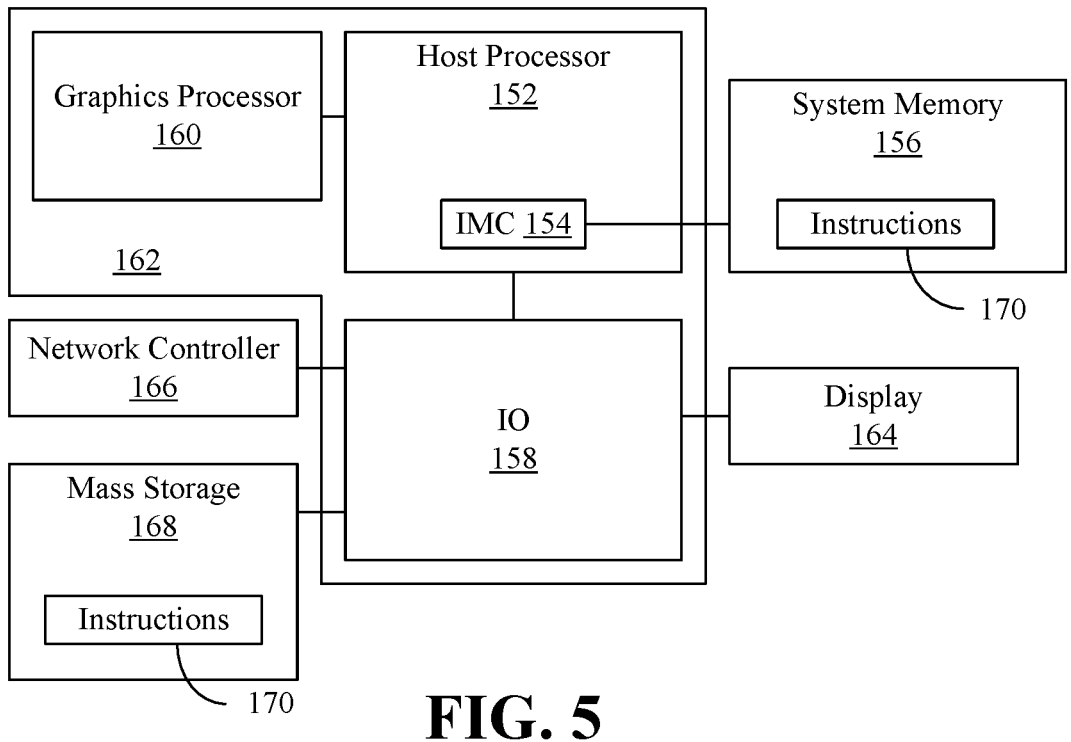
FIG. 5 is a block diagram of an example of a performance-enhanced computing system according to an embodiment.

Turning now to FIG. 5, a performance-enhanced computing system 150 is shown. The system 150 may generally be part of an electronic device/platform having computing functionality (e.g., personal digital assistant/PDA, notebook computer, tablet computer, convertible tablet, server), communications functionality (e.g., smart phone), imaging functionality (e.g., camera, camcorder), media playing functionality (e.g., smart television/TV), wearable functionality (e.g., watch, eyewear, headwear, footwear, jewelry), vehicular functionality (e.g., car, truck, motorcycle), robotic functionality (e.g., autonomous robot), etc., or any combination thereof. In the illustrated example, the system 150 includes a host processor 152 (e.g., central processing unit/CPU) having an integrated memory controller (IMC) 154 that is coupled to a system memory 156.

The illustrated system 150 also includes an input output (IO) module 158 implemented together with the host processor 152 and a graphics processor 160 on a semiconductor die 162 as a system on chip (SoC). The illustrated IO module 158 communicates with, for example, a display 164 (e.g., touch screen, liquid crystal display/LCD, light emitting diode/LED display), a network controller 166 (e.g., wired and/or wireless NIC), and mass storage 168 (e.g., hard disk drive/HDD, optical disk, solid state drive/SSD, flash memory).

In an embodiment, the SoC 162 is a virtualized execution environment in which the host processor 152 and/or the IO module 158 generally execute a VMM/hypervisor that sets up and runs one or more VMs (e.g., guests). Additionally, the graphics processor 160 may be a pass-through device that conducts one or more DMA transactions with the system memory 156 without the knowledge of the VMM. Thus, a VM may directly control the graphics processor 160 via one or more messages that pass through the VMM on a path (e.g., wire) that is not monitored or otherwise hidden to the VMM.

In such a case, the host processor 152 and/or the IO module 158 may execute instructions 170 retrieved from the system memory 156 and/or the mass storage 168 to perform one or more aspects of the method 60 (FIG. 2A), the method 70 (FIG. 2B), the method 80 (FIG. 3A), the method 100 (FIG. 3B) and/or the method 4 (FIG. 110), already discussed. Thus, illustrated instructions 170 include frontend driver instructions, which when executed by the host processor 152 and/or IO module 158, cause the computing system 150 to notify the hypervisor of a map request from a guest driver of the graphics processor 160, wherein the map request is associated with an attempt of the graphics processor 160 to access a guest memory page in the virtualized execution environment. The frontend driver instructions, when executed, may also cause the computing system 150 to determine whether the guest memory page is pinned and send a map hypercall to the hypervisor if the guest memory page is not pinned. In an embodiment, the frontend driver instructions, when executed, bypass the map hypercall if the guest memory page is pinned and bypass unmap hypercalls altogether.

The instructions 170 may also include hypervisor instructions, which when executed by the host processor 152 and/or the IO module, cause the computing system 150 to bypass pinning operations at a creation time of the VM. Execution of the hypervisor instructions may also cause the computing system 150 to receive the map hypercall from the frontend driver, pin the guest memory page in response to the map hypercall, and set a bit corresponding to a GFN in a pinned bitmap in response to the map hypercall. In such a case, the GFN is associated with the guest memory page and the pinned bitmap is in a shared memory.

In an embodiment, the hypervisor instructions, when executed, also cause the computing system to determine that the guest memory page is pinned in the virtualized execution environment and determine, based on a DMA bitmap, that an unmap request from the guest driver has been issued. In such a case, execution of the hypervisor instructions causes the computing system 150 to unpin the guest memory page. In one example, execution of the hypervisor instructions causes the computing system 150 to reclaim the unpinned guest memory page in accordance with an overcommitment policy and/or notify a live migration manager that the guest memory page is dirty.

Figure 6:
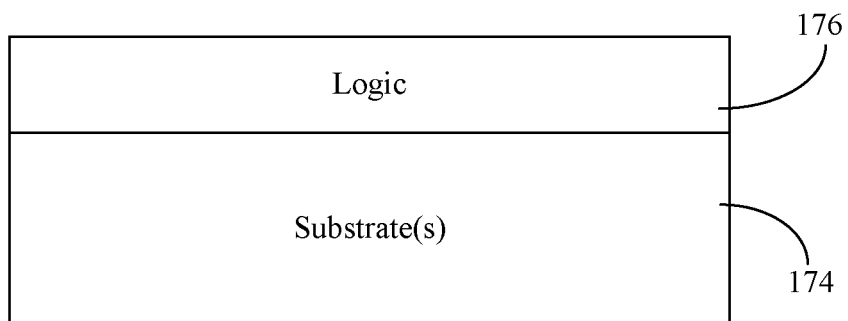
FIG. 6 is an illustration of an example of a semiconductor package apparatus according to an embodiment.

FIG. 6 shows a semiconductor apparatus 172 (e.g., chip, die, package). The illustrated apparatus 172 includes one or more substrates 174 (e.g., silicon, sapphire, gallium arsenide) and logic 176 (e.g., transistor array and other integrated circuit/IC components) coupled to the substrate(s) 174. In an embodiment, the logic 176 implements one or more aspects of the method 60 (FIG. 2A), the method 70 (FIG. 2B), the method 80 (FIG. 3A), the method 100 (FIG. 3B) and/or the method 4 (FIG. 110), already discussed. Thus, the logic 176 may notify a hypervisor of a map request from a guest driver of a device, wherein the device is to be passed through to and directly controlled by a VM, and wherein the map request is associated with an attempt of the device to access a guest memory page in a virtualized execution environment. The logic 176 may also determine whether the guest memory page is pinned and send a map hypercall to the hypervisor if the guest memory page is not pinned. In an embodiment, the logic 176 bypasses the map hypercall if the guest memory page is pinned and bypasses all unmap hypercalls.

The logic 176 may also bypass pinning operations at a creation time of the VM. In an embodiment, the logic 176 receives a map hypercall from a frontend driver, pins the guest memory page in response to the map hypercall, and sets a bit corresponding to a GFN in a pinned bitmap in response to the map hypercall. In such a case, the GFN is associated with the guest memory page and the pinned bitmap is in a shared memory.

In an embodiment, the logic 176 also determines that the guest memory page is pinned in the virtualized execution environment and determines, based on a DMA bitmap, that an unmap request from the guest driver has been issued. In such a case, the logic 176 unpins the guest memory page. In one example, the logic 176 also reclaims the unpinned guest memory page in accordance with an overcommitment policy and/or notifies a live migration manager that the guest memory page is dirty.

The logic 176 may be implemented at least partly in configurable logic or fixed-functionality hardware logic. In one example, the logic 176 includes transistor channel regions that are positioned (e.g., embedded) within the substrate(s) 174. Thus, the interface between the logic 176 and the substrate(s) 174 may not be an abrupt junction. The logic 176 may also be considered to include an epitaxial layer that is grown on an initial wafer of the substrate(s) 174.

Figure 7:
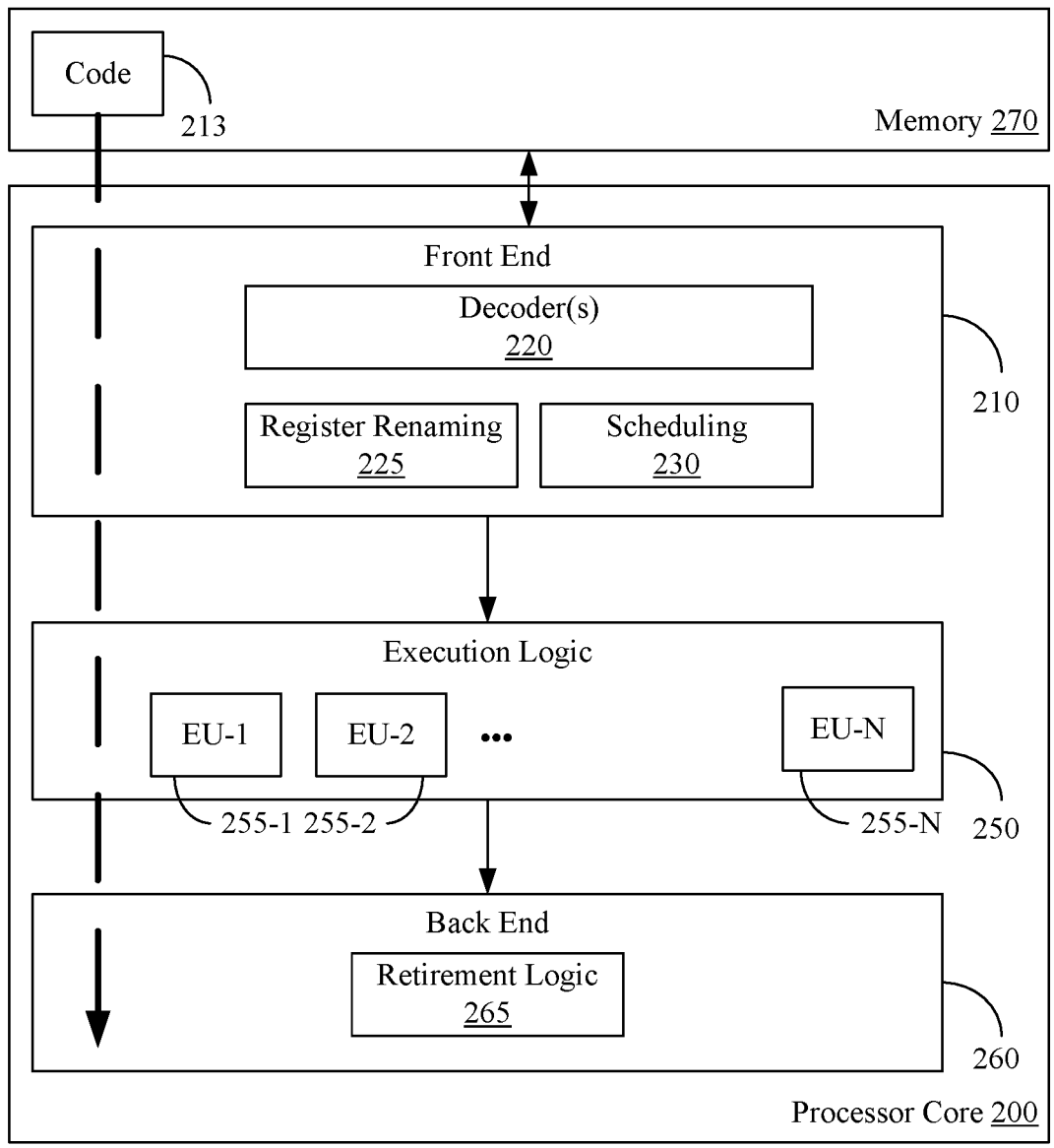
FIG. 7 is a block diagram of an example of a processor according to an embodiment.

FIG. 7 illustrates a processor core 200 according to one embodiment. The processor core 200 may be the core for any type of processor, such as a micro-processor, an embedded processor, a digital signal processor (DSP), a network processor, or other device to execute code. Although only one processor core 200 is illustrated in FIG. 7, a processing element may alternatively include more than one of the processor core 200 illustrated in FIG. 7. The processor core 200 may be a single-threaded core or, for at least one embodiment, the processor core 200 may be multithreaded in that it may include more than one hardware thread context (or "logical processor") per core.

FIG. 7 also illustrates a memory 270 coupled to the processor core 200. The memory 270 may be any of a wide variety of memories (including various layers of memory hierarchy) as are known or otherwise available to those of skill in the art. The memory 270 may include one or more code 213 instruction(s) to be executed by the processor core 200, wherein the code 213 may implement method 60 (FIG. 2A), the method 70 (FIG. 2B), the method 80 (FIG. 3A), the method 100 (FIG. 3B) and/or the method 4 (FIG. 110), already discussed. The processor core 200 follows a program sequence of instructions indicated by the code 213. Each instruction may enter a front end portion 210 and be processed by one or more decoders 220. The decoder 220 may generate as its output a micro operation such as a fixed width micro operation in a predefined format, or may generate other instructions, microinstructions, or control signals which reflect the original code instruction. The illustrated front end portion 210 also includes register renaming logic 225 and scheduling logic 230, which generally allocate resources and queue the operation corresponding to the convert instruction for execution.

The processor core 200 is shown including execution logic 250 having a set of execution units 255-1 through 255-N. Some embodiments may include a number of execution units dedicated to specific functions or sets of functions. Other embodiments may include only one execution unit or one execution unit that can perform a particular function. The illustrated execution logic 250 performs the operations specified by code instructions.

After completion of execution of the operations specified by the code instructions, back end logic 260 retires the instructions of the code 213. In one embodiment, the processor core 200 allows out of order execution but requires in order retirement of instructions. Retirement logic 265 may take a variety of forms as known to those of skill in the art (e.g., re-order buffers or the like). In this manner, the processor core 200 is transformed during execution of the code 213, at least in terms of the output generated by the decoder, the hardware registers and tables utilized by the register renaming logic 225, and any registers (not shown) modified by the execution logic 250.

Although not illustrated in FIG. 7, a processing element may include other elements on chip with the processor core 200. For example, a processing element may include memory control logic along with the processor core 200. The processing element may include I/O control logic and/or may include I/O control logic integrated with memory control logic. The processing element may also include one or more caches.

Referring now to FIG. 8, shown is a block diagram of a computing system 1000 embodiment in accordance with an embodiment. Shown in FIG. 8 is a multiprocessor system 1000 that includes a first processing element 1070 and a second processing element 1080. While two processing elements 1070 and 1080 are shown, it is to be understood that an embodiment of the system 1000 may also include only one such processing element.

The system 1000 is illustrated as a point-to-point interconnect system, wherein the first processing element 1070 and the second processing element 1080 are coupled via a point-to-point interconnect 1050. It should be understood that any or all of the interconnects illustrated in FIG. 8 may be implemented as a multi-drop bus rather than point-to-point interconnect.

As shown in FIG. 8, each of processing elements 1070 and 1080 may be multicore processors, including first and second processor cores (i.e., processor cores 1074a and 1074b and processor cores 1084a and 1084b). Such cores 1074a, 1074b, 1084a, 1084b may be configured to execute instruction code in a manner similar to that discussed above in connection with FIG. 7.

Each processing element 1070, 1080 may include at least one shared cache 1896a, 1896b. The shared cache 1896a, 1896b may store data (e.g., instructions) that are utilized by one or more components of the processor, such as the cores 1074a, 1074b and 1084a, 1084b, respectively. For example, the shared cache 1896a, 1896b may locally cache data stored in a memory 1032, 1034 for faster access by components of the processor. In one or more embodiments, the shared cache 1896a, 1896b may include one or more mid-level caches, such as level 2 (L2), level 3 (L3), level 4 (L4), or other levels of cache, a last level cache (LLC), and/or combinations thereof.

While shown with only two processing elements 1070, 1080, it is to be understood that the scope of the embodiments are not so limited. In other embodiments, one or more additional processing elements may be present in a given processor. Alternatively, one or more of processing elements 1070, 1080 may be an element other than a processor, such as an accelerator or a field programmable gate array. For example, additional processing element(s) may include additional processors(s) that are the same as a first processor 1070, additional processor(s) that are heterogeneous or asymmetric to processor a first processor 1070, accelerators (such as, e.g., graphics accelerators or digital signal processing (DSP) units), field programmable gate arrays, or any other processing element. There can be a variety of differences between the processing elements 1070, 1080 in terms of a spectrum of metrics of merit including architectural, micro architectural, thermal, power consumption characteristics, and the like. These differences may effectively manifest themselves as asymmetry and heterogeneity amongst the processing elements 1070, 1080. For at least one embodiment, the various processing elements 1070, 1080 may reside in the same die package.

The first processing element 1070 may further include memory controller logic (MC) 1072 and point-to-point (P-P) interfaces 1076 and 1078. Similarly, the second processing element 1080 may include a MC 1082 and P-P interfaces 1086 and 1088. As shown in FIG. 8, MC's 1072 and 1082 couple the processors to respective memories, namely a memory 1032 and a memory 1034, which may be portions of main memory locally attached to the respective processors. While the MC 1072 and 1082 is illustrated as integrated into the processing elements 1070, 1080, for alternative embodiments the MC logic may be discrete logic outside the processing elements 1070, 1080 rather than integrated therein.

The first processing element 1070 and the second processing element 1080 may be coupled to an I/O subsystem 1090 via P-P interconnects 1076 1086, respectively. As shown in FIG. 8, the I/O subsystem 1090 includes P-P interfaces 1094 and 1098. Furthermore, I/O subsystem 1090 includes an interface 1092 to couple I/O subsystem 1090 with a high performance graphics engine 1038. In one embodiment, bus 1049 may be used to couple the graphics engine 1038 to the I/O subsystem 1090. Alternately, a point-to-point interconnect may couple these components.

In turn, I/O subsystem 1090 may be coupled to a first bus 1016 via an interface 1096. In one embodiment, the first bus 1016 may be a Peripheral Component Interconnect (PCI) bus, or a bus such as a PCI Express bus or another third generation I/O interconnect bus, although the scope of the embodiments are not so limited.

As shown in FIG. 8, various I/O devices 1014 (e.g., biometric scanners, speakers, cameras, sensors) may be coupled to the first bus 1016, along with a bus bridge 1018 which may couple the first bus 1016 to a second bus 1020. In one embodiment, the second bus 1020 may be a low pin count (LPC) bus. Various devices may be coupled to the second bus 1020 including, for example, a keyboard/mouse 1012, communication device(s) 1026, and a data storage unit 1019 such as a disk drive or other mass storage device which may include code 1030, in one embodiment. The illustrated code 1030 may implement the method 60 (FIG. 2A), the method 70 (FIG. 2B), the method 80 (FIG. 3A), the method 100 (FIG. 3B) and/or the method 4 (FIG. 110), already discussed, and may be similar to the code 213 (FIG. 7), already discussed. Further, an audio I/O 1024 may be coupled to second bus 1020 and a battery 1010 may supply power to the computing system 1000.

Note that other embodiments are contemplated. For example, instead of the point-to-point architecture of FIG. 8, a system may implement a multi-drop bus or another such communication topology. Also, the elements of FIG. 8 may alternatively be partitioned using more or fewer integrated chips than shown in FIG. 8.

ADDITIONAL NOTES AND EXAMPLES

Example 1 includes a performance-enhanced computing system comprising a pass-through device, a processor, and system memory comprising a set of frontend driver instructions, which when executed by the processor, cause the computing system to notify a hypervisor of a request by the pass-through device to access a guest memory page in a virtualized execution environment, determine whether the guest memory is pinned, and send a map hypercall to the hypervisor if the guest memory page is not pinned.

Example 2 includes the computing system of Example 1, further including a shared memory that is accessible to the hypervisor and the frontend driver instructions, wherein to notify the hypervisor of the map request, the frontend driver instructions, when executed, cause the computing system to set a bit corresponding to a guest page frame number in a direct memory access (DMA) bitmap, wherein the guest page frame number is associated with the guest memory page, and wherein the DMA bitmap is to be located in the shared memory.

Example 3 includes the computing system of Example 2, wherein the frontend driver instructions, when executed, cause the computing system to clear the bit in response to an unmap request from the guest driver, wherein the unmap request is associated with an attempt of the device to discontinue access to the guest memory page.

Example 4 includes the computing system of Example 1, further including a shared memory that is accessible to the hypervisor and the frontend driver instructions, wherein to determine whether the guest memory page is pinned, the frontend driver instructions, when executed, cause the computing system to determine whether a bit corresponding to a guest page frame number in a pinned bitmap is set, wherein the guest page frame number is associated with the guest memory page, and wherein the pinned bitmap is to be located in the shared memory.

Example 5 includes the computing system of any one of Examples 1 to 4, wherein the frontend driver instructions, when executed, cause a computing system to bypass the map hypercall if the guest memory page is pinned, and bypass all unmap hypercalls.

Example 6 includes at least one computer readable storage medium comprising a set of frontend driver instructions, which when executed by a computing system, cause the computing system to notify a hypervisor of a map request from a guest driver of a device, wherein the device is to be passed through to and directly controlled by a virtual machine, and wherein the map request is associated with an attempt of the device to access a guest memory page in a virtualized execution environment, determine whether the guest memory page is pinned, and send a map hypercall to the hypervisor if the guest memory page is not pinned.

Example 7 includes the at least one computer readable storage medium of Example 6, wherein to notify the hypervisor of the map request, the frontend driver instructions, when executed, cause the computing system to set a bit corresponding to a guest page frame number in a direct memory access (DMA) bitmap, wherein the guest page frame number is associated with the guest memory page, and wherein the DMA bitmap is to be located in a shared memory that is accessible to the hypervisor and the frontend driver instructions.

Example 8 includes the at least one computer readable storage medium of Example 7, wherein the frontend driver instructions, when executed, cause the computing system to clear the bit in response to an unmap request from the guest driver, wherein the unmap request is associated with an attempt of the device to discontinue access to the guest memory page.

Example 9 includes the at least one computer readable storage medium of Example 6, wherein to determine whether the guest memory page is pinned, the frontend driver instructions, when executed, cause the computing system to determine whether a bit corresponding to a guest page frame number in a pinned bitmap is set, wherein the guest page frame number is associated with the guest memory page, and wherein the pinned bitmap is to be located in a shared memory that is accessible to the hypervisor and the frontend driver instructions.

Example 10 includes the at least one computer readable storage medium of any one of Examples 6 to 9, wherein the frontend driver instructions, when executed, cause a computing system to bypass the map hypercall if the guest memory page is pinned, and bypass all unmap hypercalls.

Example 11 includes a performance-enhanced computing system comprising a device, wherein the device is to be passed through to and directly controlled by a virtual machine, a processor, and a system memory comprising a set of hypervisor instructions, which when executed by the processor, cause the computing system to determine that a guest memory page is pinned in a virtualized execution environment, determine, based on a direct memory access (DMA) bitmap, that an unmap request from a guest driver of a device has been issued, wherein the device is to be passed through to and directly controlled by a virtual machine, and wherein the unmap request is associated with an attempt of the device to discontinue access to the guest memory page, and unpin the guest memory page.

Example 12 includes the computing system of Example 11, further including a shared memory that is accessible to the frontend driver and the hypervisor instructions, wherein to determine that the unmap request has been issued, the hypervisor instructions, when executed, cause the computing system to determine that a bit corresponding to a guest page frame number in the DMA bitmap is not set, wherein the guest page frame number is associated with the guest memory page, and wherein the DMA bitmap is to be located in the shared memory.

Example 13 includes the computing system of Example 11, wherein the hypervisor instructions, when executed, cause the computing system to clear a bit corresponding to a guest page frame number in a pinned bitmap, wherein the guest page frame number is associated with the guest memory page, and wherein the pinned bitmap is to be located in the shared memory.

Example 14 includes the computing system of Example 13, wherein the hypervisor instructions, when executed, cause the computing system to reset the bit if a race condition is detected, and wherein the guest memory page is unpinned if the race condition is not detected.

Example 15 includes the computing system of Example 11, wherein the hypervisor instructions, when executed, cause the computing system to receive a map hypercall from the frontend driver, pin the guest memory page in response to the map hypercall, and set a bit corresponding to a guest page frame number in a pinned bitmap in response to the map hypercall, wherein the guest page frame number is associated with the guest memory page, and wherein the pinned bitmap is to be located in the shared memory.

Example 16 includes the computing system of Example 15, wherein the hypervisor instructions, when executed, cause the computing system to bypass pinning operations at a creation time of the virtual machine.

Example 17 includes the computing system of any one of Examples 11 to 16, wherein the hypervisor instructions, when executed, cause the computing system to reclaim the unpinned guest memory page in accordance with an overcommitment policy, and notify a live migration manager that the guest memory page is dirty.

Example 18 includes at least one computer readable storage medium comprising a set of hypervisor instructions, which when executed by a computing system, cause the computing system to determine that a guest memory page is pinned in a virtualized execution environment, determine, based on a direct memory access (DMA) bitmap, that an unmap request from a guest driver of a device has been issued, wherein the device is to be passed through to and directly controlled by a virtual machine, and wherein the unmap request is associated with an attempt of the device to discontinue access to the guest memory page, and unpin the guest memory page.

Example 19 includes the at least one computer readable storage medium of Example 18, wherein to determine that the unmap request has been issued, the hypervisor instructions, when executed, cause the computing system to determine that a bit corresponding to a guest page frame number in the DMA bitmap is not set, wherein the guest page frame number is associated with the guest memory page, and wherein the DMA bitmap is to be located in a shared memory that is accessible to the frontend driver and the hypervisor instructions.

Example 20 includes the at least one computer readable storage medium of Example 18, wherein the hypervisor instructions, when executed, cause the computing system to clear a bit corresponding to a guest page frame number in a pinned bitmap, wherein the guest page frame number is associated with the guest memory page, and wherein the pinned bitmap is to be located in a shared memory that is accessible to the frontend driver.

Example 21 includes the at least one computer readable storage medium of Example 20, wherein the hypervisor instructions, when executed, cause the computing system to reset the bit if a race condition is detected, and wherein the guest memory page is unpinned if the race condition is not detected.

Example 22 includes the at least one computer readable storage medium of Example 18, wherein the hypervisor instructions, when executed, cause the computing system to receive a map hypercall from the frontend driver, pin the guest memory page in response to the map hypercall, and set a bit corresponding to a guest page frame number in a pinned bitmap in response to the map hypercall, wherein the guest page frame number is associated with the guest memory page, and wherein the pinned bitmap is to be located in a shared memory that is accessible to the frontend driver.

Example 23 includes the at least one computer readable storage medium of Example 22, wherein the hypervisor instructions, when executed, cause the computing system to bypass pinning operations at a creation time of the virtual machine.

Example 24 includes the at least one computer readable storage medium of any one of Examples 18 to 22, wherein the hypervisor instructions, when executed, cause the computing system to reclaim the unpinned guest memory page in accordance with an overcommitment policy, and notify a live migration manager that the guest memory page is dirty.

Example 25 includes a method of operating a frontend driver, comprising notifying a hypervisor of a map request from a guest driver of a device, wherein the device is passed through to and directly controlled by a virtual machine, and wherein the map request is associated with an attempt of the device to access a guest memory page in a virtualized execution environment, determining whether the guest memory page is pinned, and sending a map hypercall to the hypervisor if the guest memory page is not pinned.

Example 26 includes a method of operating a hypervisor, comprising determining that a guest memory page is pinned in a virtualized execution environment, determining, based on a direct memory access (DMA) bitmap, that an unmap request from a guest driver of a device has been issued, wherein the device is passed through to and directly controlled by a virtual machine, and wherein the unmap request is associated with an attempt of the device to discontinue access to the guest memory page, and unpinning the guest memory page.

Example 27 includes means for performing the methods of any one of Examples 25 to 26.

Thus, technology described herein may facilitate greater usage of pass-through devices in terms of accelerators (e.g., GPUs, FPGAs, Non-Volatile Memory Express/NVMe devices, etc.) and vendor specific I/O offloading cards. The technology closes feature gaps (e.g., boot time, memory overcommitment, live migration, etc.) associated with device pass-through. Additionally, there may be several years before mature support of input/output (I/O) page fault is commercially available, while existing vIOMMU approaches cannot be enabled in most production environments due to high performance cost.

The technology described herein provides a clean and architectural approach to close feature gaps, based on a bi-directional DMA information sharing framework (e.g., all existing vIOMMU approaches may be uni-directional). Such a framework enables the guest IOMMU driver to remove VM-exits for all unmap requests and greatly reduce VM-exits for most map requests. Accordingly, a production environment with light performance cost is achieved. In the meantime, the introduction of pinning manager may further use the bi-directional information to heuristically pin/unpin guest memory pages, which can effectively address both guest DMA requirements (e.g., no I/O page fault) and host DMA-tracking purposes in the usages.

Simply put, the technology described herein avoids the performance costs associated with a vIOMMU and addresses ecosystem readiness concerns associated with I/O page faults.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/ or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" may mean any combination of the listed terms. For example, the phrases "one or more of A, B or C" may mean A, B, C; A and B; A and C; B and C; or A, B and C.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. A performance-enhanced computing system comprising:
a physical device, wherein the physical device is to be passed through to and directly controlled by a virtual machine;
a processor; and
a system memory comprising a set of frontend driver instructions, which when executed by the processor, cause the computing system to:
notify a hypervisor of a map request from a guest driver of the physical device, wherein the map request is associated with an attempt of the physical device to access a guest memory page in a virtualized execution environment, wherein to notify the hypervisor of the map request, the frontend driver instructions, when executed, cause the computing system to set a bit corresponding to a guest page frame number in a direct memory access (DMA) bitmap, wherein the guest page frame number is associated with the guest memory page,
determine whether the guest memory page is pinned,
send a map hypercall to the hypervisor if the guest memory page is not pinned, and
clear the bit in response to an unmap request from the guest driver, wherein the unmap request is associated with an attempt of the physical device to discontinue access to the guest memory page.

2. The computing system of claim 1, further including a shared memory that is accessible to the hypervisor and the frontend driver instructions, wherein the DMA bitmap is to be located in the shared memory.

3. The computing system of claim 1, further including a shared memory that is accessible to the hypervisor and the frontend driver instructions, wherein to determine whether the guest memory page is pinned, the frontend driver instructions, when executed, cause the computing system to determine whether a bit corresponding to a guest page frame number in a pinned bitmap is set, wherein the guest page frame number is associated with the guest memory page, and wherein the pinned bitmap is to be located in the shared memory.

4. The computing system of claim 1, wherein the frontend driver instructions, when executed, cause the computing system to:
bypass the map hypercall if the guest memory page is pinned; and
bypass all unmap hypercalls.

5. At least one non-transitory computer readable storage medium comprising a set of frontend driver instructions which, when executed by a computing system, cause the computing system to:
notify a hypervisor of a map request from a guest driver of a physical device, wherein the physical device is to be passed through to and directly controlled by a virtual machine, and wherein the map request is associated with an attempt of the physical device to access a guest memory page in a virtualized execution environment, wherein to notify the hypervisor of the map request, the frontend driver instructions, when executed, cause the computing system to set a bit corresponding to a guest page frame number in a direct memory access (DMA) bitmap, and wherein the guest page frame number is associated with the guest memory page;
determine whether the guest memory page is pinned;
send a map hypercall to the hypervisor if the guest memory page is not pinned, and
clear the bit in response to an unmap request from the guest driver, wherein the unmap request is associated with an attempt of the physical device to discontinue access to the guest memory page.

6. The at least one non-transitory computer readable storage medium of claim 5, wherein the DMA bitmap is to be located in a shared memory that is accessible to the hypervisor and the frontend driver instructions.

7. The at least one non-transitory computer readable storage medium of claim 5, wherein to determine whether the guest memory page is pinned, the frontend driver instructions, when executed, cause the computing system to determine whether a bit corresponding to a guest page frame number in a pinned bitmap is set, wherein the guest page frame number is associated with the guest memory page, and wherein the pinned bitmap is to be located in a shared memory that is accessible to the hypervisor and the frontend driver instructions.

8. The at least one non-transitory computer readable storage medium of claim 5, wherein the frontend driver instructions, when executed, cause the computing system to:
bypass the map hypercall if the guest memory page is pinned; and
bypass all unmap hypercalls.

9. A performance-enhanced computing system comprising:
a physical device, wherein the physical device is to be passed through to and directly controlled by a virtual machine;
a processor; and
a system memory comprising a set of hypervisor instructions, which when executed by the processor, cause the computing system to:
determine that a guest memory page is pinned in a virtualized execution environment,
determine, based on a direct memory access (DMA) bitmap, that an unmap request from a guest driver of a physical device has been issued, wherein the physical device is to be passed through to and directly controlled by a virtual machine, wherein the unmap request is associated with an attempt of the physical device to discontinue access to the guest memory page, wherein to determine that the unmap request has been issued, the hypervisor instructions, when executed, cause the computing system to determine that a bit corresponding to a guest page frame number in the DMA bitmap is not set, and wherein the guest page frame number is associated with the guest memory page, and
unpin the guest memory page.

10. The computing system of claim 9, further including a shared memory that is accessible to a frontend driver and the hypervisor instructions, wherein the DMA bitmap is to be located in the shared memory.

11. The computing system of claim 9, wherein the hypervisor instructions, when executed, cause the computing system to clear a bit corresponding to a guest page frame number in a pinned bitmap, wherein the guest page frame number is associated with the guest memory page, and wherein the pinned bitmap is to be located in the shared memory.

12. The computing system of claim 11, wherein the hypervisor instructions, when executed, cause the computing system to reset the bit if a race condition is detected, and wherein the guest memory page is unpinned if the race condition is not detected.

13. The computing system of claim 9, wherein the hypervisor instructions, when executed, cause the computing system to:
receive a map hypercall from a frontend driver,
pin the guest memory page in response to the map hypercall, and
set a bit corresponding to a guest page frame number in a pinned bitmap in response to the map hypercall, wherein the guest page frame number is associated with the guest memory page, and wherein the pinned bitmap is to be located in the shared memory.

14. The computing system of claim 13, wherein the hypervisor instructions, when executed, cause the computing system to bypass pinning operations at a creation time of the virtual machine.

15. The computing system of claim 9, wherein the hypervisor instructions, when executed, cause the computing system to:
reclaim the unpinned guest memory page in accordance with an overcommitment policy; and
notify a live migration manager that the guest memory page is dirty.

16. At least one non-transitory computer readable storage medium comprising a set of hypervisor instructions which, when executed by a computing system, cause the computing system to:
determine that a guest memory page is pinned in a virtualized execution environment;
determine, based on a direct memory access (DMA) bitmap, that an unmap request from a guest driver of a physical device has been issued, wherein the physical device is to be passed through to and directly controlled by a virtual machine, wherein the unmap request is associated with an attempt of the physical device to discontinue access to the guest memory page, wherein to determine that the unmap request has been issued, the hypervisor instructions, when executed, cause the computing system to determine that a bit corresponding to a guest page frame number in the DMA bitmap is not set, and wherein the guest page frame number is associated with the guest memory page; and
unpin the guest memory page.

17. The at least one non-transitory computer readable storage medium of claim 16, wherein the DMA bitmap is to be located in a shared memory that is accessible to a frontend driver and the hypervisor instructions.

18. The at least one non-transitory computer readable storage medium of claim 16, wherein the hypervisor instructions, when executed, cause the computing system to clear a bit corresponding to a guest page frame number in a pinned bitmap, wherein the guest page frame number is associated with the guest memory page, and wherein the pinned bitmap is to be located in a shared memory that is accessible to a frontend driver.

19. The at least one non-transitory computer readable storage medium of claim 18, wherein the hypervisor instructions, when executed, cause the computing system to reset the bit if a race condition is detected, and wherein the guest memory page is unpinned if the race condition is not detected.

20. The at least one non-transitory computer readable storage medium of claim 16, wherein the hypervisor instructions, when executed, cause the computing system to:
receive a map hypercall from a frontend driver;
pin the guest memory page in response to the map hypercall; and
set a bit corresponding to a guest page frame number in a pinned bitmap in response to the map hypercall, wherein the guest page frame number is associated with the guest memory page, and wherein the pinned bitmap is to be located in a shared memory that is accessible to the frontend driver.

21. The at least one non-transitory computer readable storage medium of claim 20, wherein the hypervisor instructions, when executed, cause the computing system to bypass pinning operations at a creation time of the virtual machine.

22. The at least one non-transitory computer readable storage medium of claim 16, wherein the hypervisor instructions, when executed, cause the computing system to:
reclaim the unpinned guest memory page in accordance with an overcommitment policy; and
notify a live migration manager that the guest memory page is dirty.

* * * * *